(12) United States Patent
Kanda

(10) Patent No.: US 8,440,288 B2
(45) Date of Patent: May 14, 2013

(54) EASILY APPLICABLE ADHESIVE SHEET AND METHOD OF PRODUCING THE SAME

(75) Inventor: Toshimitsu Kanda, Itabashi-ku (JP)

(73) Assignee: Lintec Corporation, Tokyo (JP)

( * ) Notice: Subject to any disclaimer, the term of this patent is extended or adjusted under 35 U.S.C. 154(b) by 568 days.

(21) Appl. No.: 12/671,771

(22) PCT Filed: Jul. 28, 2008

(86) PCT No.: PCT/JP2008/063528
§ 371 (c)(1),
(2), (4) Date: Feb. 2, 2010

(87) PCT Pub. No.: WO2009/020003
PCT Pub. Date: Feb. 12, 2009

(65) Prior Publication Data
US 2011/0229694 A1   Sep. 22, 2011

(30) Foreign Application Priority Data

Aug. 3, 2007   (JP) .................. 2007-203334

(51) Int. Cl.
*B32B 3/28* (2006.01)
*B32B 3/30* (2006.01)
*B32B 15/04* (2006.01)
*B32B 7/12* (2006.01)

(52) U.S. Cl.
USPC ........... 428/167; 428/343; 428/156; 428/40.1

(58) Field of Classification Search ........ 428/40.1, 428/167, 156, 343, 354, 41.8
See application file for complete search history.

(56) References Cited

U.S. PATENT DOCUMENTS
2004/0224129 A1* 11/2004 Sakurai et al. ........... 428/156

FOREIGN PATENT DOCUMENTS

| JP | 2002 513067 | 5/2002 |
| JP | 2003 336018 | 11/2003 |
| JP | 2006 130672 | 5/2006 |
| JP | 2007 46003 | 2/2007 |
| WO | 03 025078 | 3/2003 |

OTHER PUBLICATIONS

U.S. Appl. No. 12/922,991, filed Sep. 16, 2010, Kanda.

* cited by examiner

*Primary Examiner* — Catherine A Simone
(74) *Attorney, Agent, or Firm* — Oblon, Spivak, McClelland, Maier & Neustadt, L.L.P.

(57) ABSTRACT

An easily applicable adhesive sheet includes a base sheet and an adhesive layer provided on the base sheet and which includes, in a surface portion thereof, air passages each including a plurality of grooves opening at an end edge portion of the adhesive sheet. Each groove has an opening width of 3 to 100 μm; the distance between adjacent grooves is 1 to 100 μm; each air passage has a width of 7 to 900 μm; and the distance between adjacent air passages is 200 to 3,000 μm. The easily applicable adhesive sheet can be smoothly applied to an adherend without formation of blisters (i.e., even when air bubbles are formed between the adhesive sheet and the adherend upon application thereof, air is easily released), and which exhibits excellent appearance after application thereof to the adherend.

7 Claims, 1 Drawing Sheet

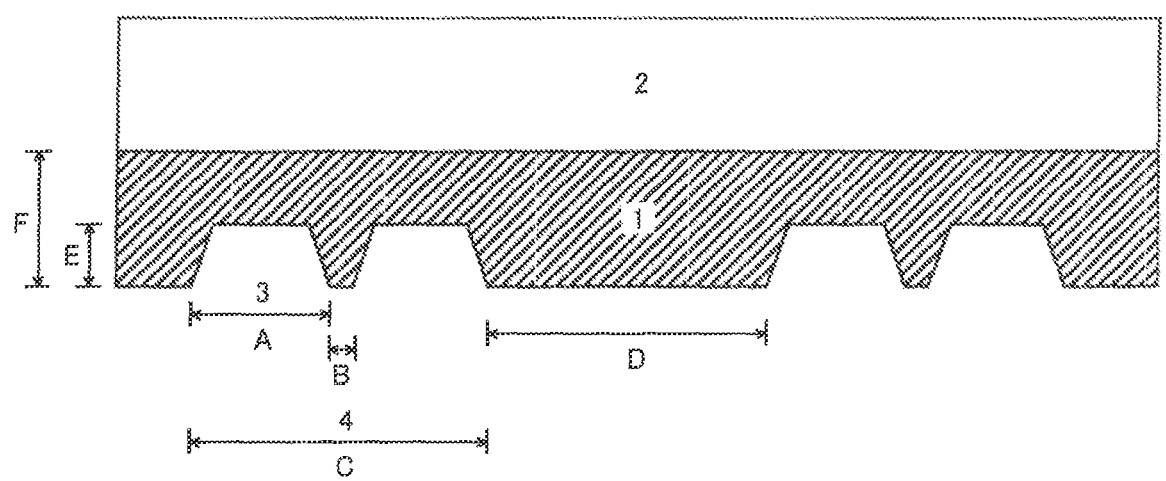

EASILY APPLICABLE ADHESIVE SHEET AND METHOD OF PRODUCING THE SAME

TECHNICAL FIELD

The present invention relates to an adhesive sheet which can be easily applied to an adherend so as to attain desired quality of adhesion (hereinafter the adhesive sheet may be referred to as an "easily applicable adhesive sheet"); and to a method for producing the adhesive sheet. More particularly, the present invention relates to an easily applicable adhesive sheet which, when applied to an adherend, causes air bubbles to be less likely to form between the adhesive sheet and the adherend (i.e., which can be easily applied to the adherend) and is not impaired in appearance, and which is particularly useful as a large-sized adhesive sheet; and to a method for effectively producing the adhesive sheet.

BACKGROUND ART

In general, an adhesive sheet includes a base sheet; an adhesive layer formed on a surface of the base sheet; and a release sheet which is optionally provided on the adhesive layer. In use of such an adhesive sheet, when the adhesive sheet includes a release sheet, the release sheet is removed therefrom, and the adhesive sheet is applied to an adherend by bringing the adhesive layer into contact with the adherend.

However, in the case of use of an adhesive sheet having a somewhat large area (e.g., an adhesive sheet for identification or decoration, an adhesive sheet for masking, or an adhesive sheet for protecting the surface of a metal plate or the like), the adhesive sheet poses a problem in that air bubbles are likely to be formed between the adhesive layer and an adherend, and the thus-formed air bubbles become "blisters"; i.e., the adhesive sheet is difficult to apply smoothly to the adherend.

In order to solve such a problem, attempts have been made to provide an adhesive sheet including an adhesive layer having air passages in a surface portion thereof, so that when the adhesive sheet is applied to an adherend, formation of air bubbles is prevented by releasing air through the flow passages (see, for example, Patent Document 1). Further, there have been proposed an adhesive sheet in which the arrangement (or arrangement pattern) of air passages (grooves) is defined such that a groove is necessarily present in any circular region having a diameter of 500 µm; i.e., the distance between adjacent grooves is small (Patent Document 2); and an easily applicable adhesive sheet in which grooves are provided in a lattice pattern so as to extend obliquely with respect to the direction of application of the adhesive sheet (Patent Document 3).

However, generally, such an adhesive sheet poses a problem in that when grooves (i.e., air passages) have a small width, it is difficult to release air therethrough, whereas when the grooves have a large width, the adhesive sheet exhibits poor appearance due to formation of dents on the surface of the base sheet. Particularly, when the distance between adjacent grooves is increased for achieving sufficient adhesion, since the width of the grooves must be increased, the adhesive sheet exhibits poor appearance due to formation of dents on the surface of the base sheet.

Patent Document 1: Japanese Patent Application Laid-Open (kokai) No. S63-223081
Patent Document 2: Japanese Kohyo Patent Publication No. 2002-544364
Patent Document 3: WO 03/025078 pamphlet

DISCLOSURE OF THE INVENTION

In view of the foregoing, an adherend of the present invention is to provide an easily applicable adhesive sheet which is smoothly applied to an adherend without formation of "blisters" (i.e., even when air bubbles are formed between the adhesive sheet and the adherend upon application thereof, air is easily released), and which exhibits excellent appearance after application thereof to the adherend.

The present inventor has conducted extensive studies for developing such an easily applicable adhesive sheet, and as a result has found that the aforementioned adherend can be achieved by providing a structure including an air passage formed of a plurality of grooves, wherein, in the air passage, the opening width of each groove is small, and the distance between adjacent grooves is small. The present invention has been accomplished on the basis of this finding.

Accordingly, the present invention provides:

(1) an easily applicable adhesive sheet characterized by comprising a base sheet, and an adhesive layer which is provided on the base sheet and which has, in a surface portion thereof, air passages each consisting of a plurality of grooves opening at an end edge portion of the adhesive sheet, wherein each groove has an opening width of 3 to 100 µm; the distance between adjacent grooves is 1 to 100 µm; each air passage has a width of 7 to 900 µm; and the distance between adjacent air passages is 200 to 3,000 µm;

(2) an easily applicable adhesive sheet according to (1) above, wherein each air passage consists of two to five parallel grooves;

(3) an easily applicable adhesive sheet according to (1) or (2) above, wherein the air passages are arranged in a lattice pattern such that they intersect at an angle of 40 to 140°;

(4) an easily applicable adhesive sheet according to (1) or (2) above, wherein each groove has a V-shaped, U-shaped, rectangular, or trapezoidal cross section;

(5) an easily applicable adhesive sheet according to (1) or (2) above, wherein each groove has a depth of 5 to 50 µm;

(6) an easily applicable adhesive sheet according to (1) or (2) above, wherein the adhesive layer has a thickness of 7 to 100 µm; and (7) a method for producing an easily applicable adhesive sheet as recited in (1) or (2) above, characterized by comprising forming an adhesive layer on a releasably treated layer of a release sheet, the releasably treated layer having a pattern transfer surface; and subsequently applying a base sheet to the adhesive layer.

In the easily applicable adhesive sheet of the present invention, air passages each include a plurality of grooves, and the distance between adjacent grooves in the air passage is small. Therefore, even in the case where air bubbles are formed between the adhesive sheet and an adherend upon application of the adhesive sheet, when the air bubbles are pressed with, for example, a squeegee, since an adhesive surface between grooves is detached from the adherend by air pressure, and a plurality of grooves communicate with one another to form a wider air passage, air is easily released. After release of air, the inter-groove adhesive surface again adheres to the adherend. Since each groove has a small opening width, no dents are formed on the surface of the base sheet, and the adhesive sheet exhibits excellent appearance. Thus, according to the present invention, there can be provided an adhesive sheet which, when applied to an adherend, allows easy release of air and can closely and finely adhere to the adherend with ease, and which is not impaired in appearance after application thereof to the adherend.

The adhesive sheet of the present invention is particularly suitable as a large-sized adhesive sheet for decoration of, for example, a signboard, a wall, or a vehicle.

BRIEF DESCRIPTION OF THE DRAWINGS

FIG. 1 is a cross-sectional view of an adhesive layer 1 of an adhesive sheet according to an embodiment of the present invention.

DESCRIPTION OF REFERENCE NUMERALS

1. Adhesive layer
2. Base sheet
3. Groove
4. Air passage
A. Opening width of groove
B. Distance between adjacent grooves
C. Width of air passage consisting of a plurality of parallel grooves
D. Distance between adjacent air passages
E. Depth of groove
F. Thickness of adhesive layer

BEST MODES FOR CARRYING OUT THE INVENTION

The adhesive sheet of the present invention includes a base sheet, and an adhesive layer which is formed on a surface of the base sheet and includes air passages having a specific structure. No particular limitation is imposed on the base sheet, and the base sheet may be any one appropriately selected from among base sheets conventionally used for adhesive sheets.

Examples of the base sheet include papers such as wood-free paper, glassine paper, and coated paper; sheets of plastics such as polyesters (e.g., polyethylene terephthalate and polyethylene naphthalate), polyolefins (e.g., polypropylene and polyethylene), polyvinyl chloride, polyvinylidene chloride, polystyrene, polycarbonate, polyvinyl alcohol, polyurethane, and acrylic resin; and sheets of cellulose materials such as cellulose triacetate, cellulose diacetate, and cellophane. The thickness of the base sheet may be appropriately determined in consideration of the intended use or usage of the adhesive sheet, and is generally 10 to 300 μm, preferably 30 to 150 μm.

When the base sheet employed is a plastic sheet, the base sheet may optionally be subjected to a treatment for forming surface irregularities (e.g., sandblast or treatment with a solvent), an oxidation treatment (e.g., corona discharge, irradiation with ozone or UV rays, flame treatment, chromic acid treatment, or hot-air treatment), or other treatments, for the purpose of improving adhesion between the base sheet and the adhesive layer provided thereon.

No particular limitation is imposed on the adhesive for forming the adhesive layer provided on a surface of the aforementioned base sheet, and the adhesive employed may be an adhesive which has been conventionally used for forming an adhesive layer of an adhesive sheet, such as an acrylic adhesive, a rubber based adhesive, or a silicone based adhesive.

In the adhesive sheet of the present invention, the adhesive layer provided on the base sheet has, in a surface portion thereof, air passages each consisting of a plurality of grooves opening at an end edge portion of the adhesive sheet. Preferably, the grooves are parallel to one another.

The air passages provided in the adhesive layer surface are preferably arranged in a regular pattern (e.g., stripe pattern or lattice pattern), particularly preferably in a lattice pattern.

The air passages arranged in a lattice pattern may have the same pitch or different pitches in two crossing directions. However, preferably, the air passages have the same pitch or approximate pitches, from the viewpoint of taking no account of the direction of squeegeeing for release of air.

Preferably, the air passages arranged in a lattice pattern and extending in two crossing directions intersect at an angle of 40 to 140°.

FIG. 1 is a cross-sectional view of an adhesive layer 1 of an adhesive sheet according to an embodiment of the present invention. Next will be described the dimensions of air passages each consisting of a plurality of parallel grooves which are provided on a surface of the adhesive layer 1 formed on a base sheet 2.

Each groove must have an opening width A of 3 to 100 μm so that air can be released from air bubbles, and the presence of the groove cannot be recognized on the side of the base sheet after application of the adhesive sheet. The opening width A is preferably 10 to 50 μm.

Each groove preferably has a depth E of 5 to 50 μm, more preferably 5 to 25 μm.

Preferably, each groove has a V-shaped, U-shaped, rectangular, or trapezoidal cross section.

Preferably, each air passage consists of two to five parallel grooves.

The distance B between adjacent grooves (i.e., distance between the opening ends of adjacent grooves) must be 1 to 100 μm so that, when air bubbles are squeegeed, an adhesive surface between adjacent grooves is detached from an adherend by air pressure, and a plurality of grooves communicate with one another to form a wider air passage. The distance B is preferably 1 to 50 μm, more preferably 1 to 15 μm.

In each air passage, a plurality of grooves may have the same opening width A or different opening widths A, the same depth E or different depths E, and the same cross-sectional shape or different cross-sectional shapes. When each air passage consists of three or more grooves, the distance B between a pair of adjacent grooves may be identical to or different from that between another pair of adjacent grooves. However, in air passages arranged in a lattice pattern, preferably, the dimensions and structure (shape) of an air passage are the same as those of another air passage, from the viewpoint of realization of industrial production of the adhesive sheet.

Each air passage consisting of a plurality of grooves has a width C of 7 to 900 μm, preferably 21 to 450 μm.

The distance D between adjacent air passages must be 200 to 3,000 μm, and is preferably 400 to 2,000 μm.

The adhesive layer has a thickness F of 7 to 100 μm, preferably 7 to 50 μm.

No particular limitation is imposed on the method for producing the adhesive sheet of the present invention, so long as the method can form, on a surface of a base sheet, an adhesive layer having air passages each consisting of a plurality of grooves having the aforementioned shape characteristics. For example, any of the following methods may be employed: (1) a method in which a flat adhesive layer is provided directly on a surface of a base sheet, and subsequently air passages each consisting of a plurality of parallel grooves are formed by means of a comb blade; (2) a method in which a flat adhesive layer is provided directly on a surface of a base sheet, and subsequently the adhesive layer is brought into contact with an embossing roll, to thereby form air passages each consisting of a plurality of parallel grooves; and (3) a method in which an adhesive is applied to a releasably treated layer of a release sheet having an embossment corresponding to the shape of air passages, and a base sheet is applied to the resultant adhesive layer. Of these methods, method (3) (i.e., transfer method) is preferably employed, from the viewpoint of, for example, operability.

Through such a transfer method, an adhesive sheet of interest can be produced by forming an adhesive layer on a releasably treated layer of a release sheet, the releasably treated layer having a pattern transfer surface, and subsequently applying a base sheet to the adhesive layer. The release sheet including a releasably treated layer having a pattern transfer surface may be produced through, for example, the following procedure: a polyethylene resin or the like is thermally melted and applied to a release sheet base; a release agent (e.g., silicone resin) is applied to the base to thereby form a releasably treated layer; and the releasably treated layer is subjected to patterning through a known process. Through transfer of the pattern on the releasably treated layer, there can be formed an adhesive layer having air passages arranged in a lattice pattern, each air passage consisting of a plurality of grooves having the aforementioned shape characteristics. No particular limitation is imposed on the release sheet base employed, and the release sheet base may be any one selected from among conventionally used release sheet bases. Examples of such a release sheet base include papers such as glassine paper, coated paper, and laminated paper; and various plastic films.

In the method of the present invention, an adhesive layer is formed on the thus-formed releasably treated layer of the release sheet having a pattern transfer surface, and subsequently a base sheet is applied to the adhesive layer, to thereby produce the adhesive sheet of the present invention having the release sheet. Upon use of the adhesive sheet, the release sheet is removed therefrom, and the adhesive sheet is applied to an adherend by abutting the adhesive layer to the adherend. In the case where air bubbles are formed between the adhesive sheet and the adherend, when the air bubbles are pressed with a squeegee, air is released through an air passage formed of a plurality of grooves which have communicated with one another, and the air bubbles are eliminated. Therefore, the adhesive sheet can closely and finely adhere to the adherend with ease. The thus-applied adhesive sheet is not impaired in appearance, since dents, etc. are not formed on the surface of the base sheet, and the structure of grooves does not stand out.

EXAMPLES

The present invention will next be described in more detail by way of examples, which should not be construed as limiting the invention thereto.

Production Example 1

A butyl acrylate monomer (90 parts by weight) and an acrylic acid monomer (10 parts by weight) were added to a reactor equipped with a thermometer, a stirrer, a reflux condenser, and a nitrogen gas inlet tube, and azobisisobutyronitrile (0.3 parts by weight) was added thereto, followed by polymerization in a nitrogen gas atmosphere at 80° C. for eight hours. After completion of reaction, the solid content of the reaction mixture was adjusted to 34% with toluene, to thereby produce a solution of an acrylic copolymer having a weight average molecular weight of 500,000. An isocyanate cross-linking agent (BHS 8515, product of Toyo Ink Mfg. Co., Ltd.) (2 parts by weight) was added to the copolymer solution (100 parts by weight), to thereby produce an adhesive solution.

Examples 1 to 3 and Comparative Examples 1 and 2

A polyethylene layer and a silicone layer were sequentially provided on a wood-free paper sheet (100 g/m$^2$), to thereby prepare a release sheet. The release sheet was thermally pressed with a metallic roll having an embossment corresponding to air passages arranged in a lattice pattern, each passage consisting of grooves having a rectangular cross section (the dimensions and number of the grooves are shown in Table 1), to thereby produce a release sheet including a releasably treated layer having a pattern transfer surface.

The adhesive solution produced in Production Example 1 was applied to the above-produced release sheet, and the solvent was dried. Subsequently, a vinyl chloride sheet (thickness: 50 μm) was applied to the resultant adhesive layer, to thereby produce an adhesive sheet including the adhesive layer having, in a surface portion thereof, air passages arranged in a lattice pattern, each passage consisting of grooves having a rectangular cross section (the dimensions and number of the grooves are shown in Table 1).

The thus-produced adhesive sheet was subjected to the following tests. The results are shown in Table 1.

(1) "Air Bubble Elimination Test"

The adhesive sheet was cut into test pieces each having a size of 50 mm×50 mm. A test piece was applied to a melamine-coated plate so that a circular air bubble (diameter: about 15 mm) was formed. Subsequently, the air bubble was pressed with a squeegee, and then whether or not the air bubble was eliminated was determined. When the air bubble was easily eliminated, rating "O" was assigned, whereas when the air bubble was not eliminated, rating "x" was assigned.

(2) "Appearance Test"

The test piece which had undergone the aforementioned air bubble elimination test was visually observed. When the air passages were not visually recognized as surface irregularities of the base sheet, rating "O" was assigned, whereas when the air passages were visually recognized as surface irregularities of the base sheet, rating "x" was assigned.

TABLE 1

| | Distance between adjacent air passages (μm) | Opening width of groove (μm) | Number of grooves | Distance between adjacent grooves (μm) | Width of air passage (μm) | Depth of groove (μm) | Air bubble elimination test | Appearance test |
|---|---|---|---|---|---|---|---|---|
| Ex. 1 | 600 | 10 | 3 | 10 | 50 | 15 | ○ | ○ |
| Ex. 2 | 600 | 5 | 5 | 5 | 45 | 15 | ○ | ○ |
| Ex. 3 | 1000 | 50 | 2 | 15 | 115 | 15 | ○ | ○ |

TABLE 1-continued

| | Distance between adjacent air passages (μm) | Opening width of groove (μm) | Number of grooves | Distance between adjacent grooves (μm) | Width of air passage (μm) | Depth of groove (μm) | Air bubble elimination test | Appearance test |
|---|---|---|---|---|---|---|---|---|
| Comp. Ex. 1 | 1000 | 120 | 1 | — | 120 | 15 | ○ | X |
| Comp. Ex. 2 | 600 | 5 | 1 | — | 5 | 15 | X | ○ |

INDUSTRIAL APPLICABILITY

According to the present invention, there can be provided an adhesive sheet which, when applied to an adherend, allows easy release of air and can closely and finely adhere to the adherend with ease, and which is not impaired in appearance after application thereof to the adherend.

The adhesive sheet of the present invention is particularly suitable as a large-sized adhesive sheet for decoration of, for example, a signboard, a wall, or a vehicle.

The invention claimed is:

1. An easily applicable adhesive sheet comprising:
   a base sheet, and
   an adhesive layer which is provided on the base sheet and which has, in a surface portion thereof, air passages, each air passage including a plurality of grooves opening at an end edge portion of the adhesive sheet,
   wherein each groove of each air passage has an opening width of 3 to 100 μm; the distance between adjacent grooves is 1 to 15 μm; each air passage has a width of 7 to 900 μm; and the distance between adjacent air passages is 400 to 2,000 μm.

2. An easily applicable adhesive sheet according to claim 1, wherein each air passage consists of two to five parallel grooves.

3. An easily applicable adhesive sheet according to claim 1, wherein the air passages are arranged in a lattice pattern such that they intersect at an angle of 40 to 140°.

4. An easily applicable adhesive sheet according to claim 1, wherein each groove has a V-shaped, U-shaped, rectangular, or trapezoidal cross section.

5. An easily applicable adhesive sheet according to claim 1, wherein each groove has a depth of 5 to 50 μm.

6. An easily applicable adhesive sheet according to claim 1, wherein the adhesive layer has a thickness of 7 to 100 μm.

7. A method for producing an easily applicable adhesive sheet as recited in claim 1, comprising:
   forming an adhesive layer on a releasably treated layer of a release sheet, the releasably treated layer having a pattern transfer surface; and
   subsequently applying a base sheet to the adhesive layer.

* * * * *